(12) United States Patent
Myung et al.

(10) Patent No.: US 11,574,095 B2
(45) Date of Patent: Feb. 7, 2023

(54) SIMULATION SYSTEM FOR SEMICONDUCTOR PROCESS AND SIMULATION METHOD THEREOF

(71) Applicant: SAMSUNG ELECTRONICS CO., LTD., Suwon-si (KR)

(72) Inventors: Sanghoon Myung, Goyang-si (KR); Hyunjae Jang, Hwaseong-si (KR); In Huh, Seoul (KR); Hyeon Kyun Noh, Gwangmyeong-si (KR); Min-Chul Park, Hwaseong-si (KR); Changwook Jeong, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 379 days.

(21) Appl. No.: 16/906,038

(22) Filed: Jun. 19, 2020

(65) Prior Publication Data
US 2021/0158152 A1 May 27, 2021

(30) Foreign Application Priority Data
Nov. 25, 2019 (KR) .......................... 10-2019-0151830

(51) Int. Cl.
*G06F 30/27* (2020.01)
*G06N 3/08* (2006.01)
(Continued)

(52) U.S. Cl.
CPC ............ *G06F 30/27* (2020.01); *G06F 30/398* (2020.01); *G06N 3/0445* (2013.01); *G06N 3/08* (2013.01); *G06N 3/10* (2013.01)

(58) Field of Classification Search
CPC .... G06F 30/27; G06F 30/398; G06F 2119/18; G06F 30/39; G06N 3/0445; G06N 3/08;
(Continued)

(56) References Cited

U.S. PATENT DOCUMENTS 7,016,797 B2   3/2006  Takeuchi et al.
7,525,673 B2   4/2009  Vuong et al.
(Continued)

FOREIGN PATENT DOCUMENTS

JP       06-004505 A       1/1994
KR    10-1917006 B1      11/2018
WO    2018083672 A1       5/2018

*Primary Examiner* — Paul Dinh
(74) *Attorney, Agent, or Firm* — Sughrue Mion, PLLC

(57) ABSTRACT

Provided is a simulation method performed by a process simulator, implemented with a recurrent neural network (RNN) including a plurality of process emulation cells, which are arranged in time series and configured to train and predict, based on a final target profile, a profile of each process step included in a semiconductor manufacturing process. The simulation method includes: receiving, at a first process emulation cell, a previous output profile provided at a previous process step, a target profile and process condition information of a current process step; and generating, at the first process emulation cell, a current output profile corresponding to the current process step, based on the target profile, the process condition information, and prior knowledge information, the prior knowledge information defining a time series causal relationship between the previous process step and the current process step.

17 Claims, 17 Drawing Sheets

(51) Int. Cl.
*G06N 3/10* (2006.01)
*G06N 3/04* (2006.01)
*G06F 30/398* (2020.01)

(58) Field of Classification Search
CPC ...... G06N 3/10; G06N 3/0454; G06N 3/0481; Y02P 90/02; Y02P 90/80; G05B 19/41885; G05B 23/02; H01L 21/02
USPC .......................................................... 706/21
See application file for complete search history.

(56) References Cited

U.S. PATENT DOCUMENTS

| | | |
|---|---|---|
| 7,826,071 B2 | 11/2010 | Shchegrov et al. |
| 8,883,024 B2 | 11/2014 | Chen et al. |
| 9,620,338 B2 | 4/2017 | Samukawa et al. |
| 10,032,681 B2 | 7/2018 | Bailey, III et al. |
| 10,197,908 B2 | 2/2019 | Sriraman et al. |
| 10,254,641 B2 | 4/2019 | Mailfert et al. |
| 2007/0249071 A1 | 10/2007 | Lian et al. |
| 2015/0339570 A1* | 11/2015 | Scheffler ............... G06N 3/10 706/27 |
| 2017/0287751 A1 | 10/2017 | Kuznetsov et al. |
| 2019/0129297 A1 | 5/2019 | Shim |
| 2019/0147317 A1* | 5/2019 | Divekar ............... G06F 30/27 706/20 |
| 2019/0286983 A1 | 9/2019 | Jung et al. |

* cited by examiner

FIG. 4

Input of Profile Network

| Input Group | Feature | Notation |
|---|---|---|
| ① | Coordinate Parameter | $X_{WL}$ |
| ② | Incoming Structure | $Y_{k-1}$ |
| ② | Mold Information | Xcom |
| ③ | Equipment & Chamber Info | Xcom |
| ③ | PM Information | Xcom |
| ④ | Reticle | Xcom |
| ④ | Structure Sheme | Xcom |
| ④ | Constant Recipe | Xcom |
| ④ | Sequence Recipe | $X_k$ |

SIMULATION SYSTEM FOR SEMICONDUCTOR PROCESS AND SIMULATION METHOD THEREOF

CROSS-REFERENCE TO THE RELATED APPLICATION(S)

This application claims priority under 35 U.S.C. § 119 to Korean Patent Application No. 10-2019-0151830, filed on Nov. 25, 2019, in the Korean Intellectual Property Office, the disclosures of which are incorporated by reference herein in their entireties.

BACKGROUND

Example embodiments disclosed herein relate to a simulation device for a semiconductor device, and more particularly, relate to a simulation system for simulating a process of manufacturing a semiconductor device and a simulation method thereof.

A machine learning technique used in various technical fields may improve performance and efficiency in performing a task. The machine learning technique may be applied to tune a semiconductor process, to reduce costs and provide high accuracy.

In designing the semiconductor process, a fine tuning of a process is needed to obtain an optimum profile for equipment or conditions to be applied to each process step. To tune a specific process (e.g., an etching process) including a plurality of steps (or process steps), a plurality of profiles corresponding to the plurality of steps are required. However, there is a limitation in checking the plurality of profiles to be applied to the respective plurality of process steps due to cost and technology limitations.

In general, a process simulation may be used to obtain a profile of a completed process. However, only a final profile is obtained through the process simulation, and a profile associated with an intermediate step of a specific process may not be obtained. Accordingly, it is difficult to trace faults and problematic process steps of a process.

SUMMARY

One or more example embodiments provide a process simulation device using a machine learning algorithm capable of estimating a profile for each process step with high accuracy and a process simulation method thereof.

According to an aspect of an example embodiment, there is provided a simulation method performed by a process simulator, the process simulator being implemented with a recurrent neural network (RNN) driven on a computer system and including a plurality of process emulation cells. The plurality of process emulation cells may be arranged in time series and configured to train and predict, based on a final target profile in a process of manufacturing a semiconductor, a profile of each process step included in the process of manufacturing the semiconductor. The simulation method may include: receiving, at a first process emulation cell, a previous output profile provided at a previous process step; receiving, at the first process emulation cell, a target profile of a current process step and process condition information indicating one or more conditions to be applied in the current process step; and generating, at the first process emulation cell, a current output profile corresponding to the current process step, based on the target profile, the process condition information, and prior knowledge information, the prior knowledge information defining a time series causal relationship between the previous process step and the current process step.

According to an aspect of an example embodiment, there is provided a process emulation cell included in a recurrent neural network (RNN), driven on a computer system and including a plurality of process emulation cells. The plurality of process emulation cells may be arranged in time series and configured to train and predict, based on a final target profile in a process of manufacturing a semiconductor, a profile of each process step included in the process of manufacturing the semiconductor. The process emulation cell may include: a profile network configured to receive a previous output profile that is output at a previous process step in time series, a target profile of a current process step, and process condition information indicating one or more conditions to be applied in the current process step, and configured to generate a current output profile corresponding to the current process step by performing a training operation, based on the target profile, the process condition information, and prior knowledge information; and a prior knowledge network configured to restrict the training of the profile network based on the prior knowledge information provided from an outside. The prior knowledge information is provided to a function or a layer defining a time series causal relationship between the previous process step and the current process step in the process of manufacturing the semiconductor.

According to an aspect of an example embodiment, there is provided a process simulation system, which operates as a time series-based recurrent neural network (RNN) configured to receive a final target profile of a process of manufacturing a semiconductor, and configured to train and predict a profile of each process step of the process of manufacturing the semiconductor. The process simulation system may include: a random access memory (RAM) to which a process simulator is loaded; a central processing unit configured to execute the process simulator to perform training using the recurrent neural network; and an input/output interface configured to perform at least one of: receiving at least one of an input to the process simulator or the final target profile and transfer the at least one of the input or the final target profile to the central processing unit, or outputting a profile generated based on the training, the profile corresponding to a given process step of the process manufacturing the semiconductor, wherein the profile is generated based on the training, which is performed based on prior knowledge information defining a time series causal relationship in the process of manufacturing the semiconductor.

BRIEF DESCRIPTION OF THE FIGURES

The above and other aspects, features, and advantages of certain example embodiments will be more apparent from the following description taken in conjunction with the accompanying drawing.

FIG. 4 is a table schematically illustrating information or parameters provided to train a process emulation cell according to an example embodiment.

DETAILED DESCRIPTION

Figure 1:
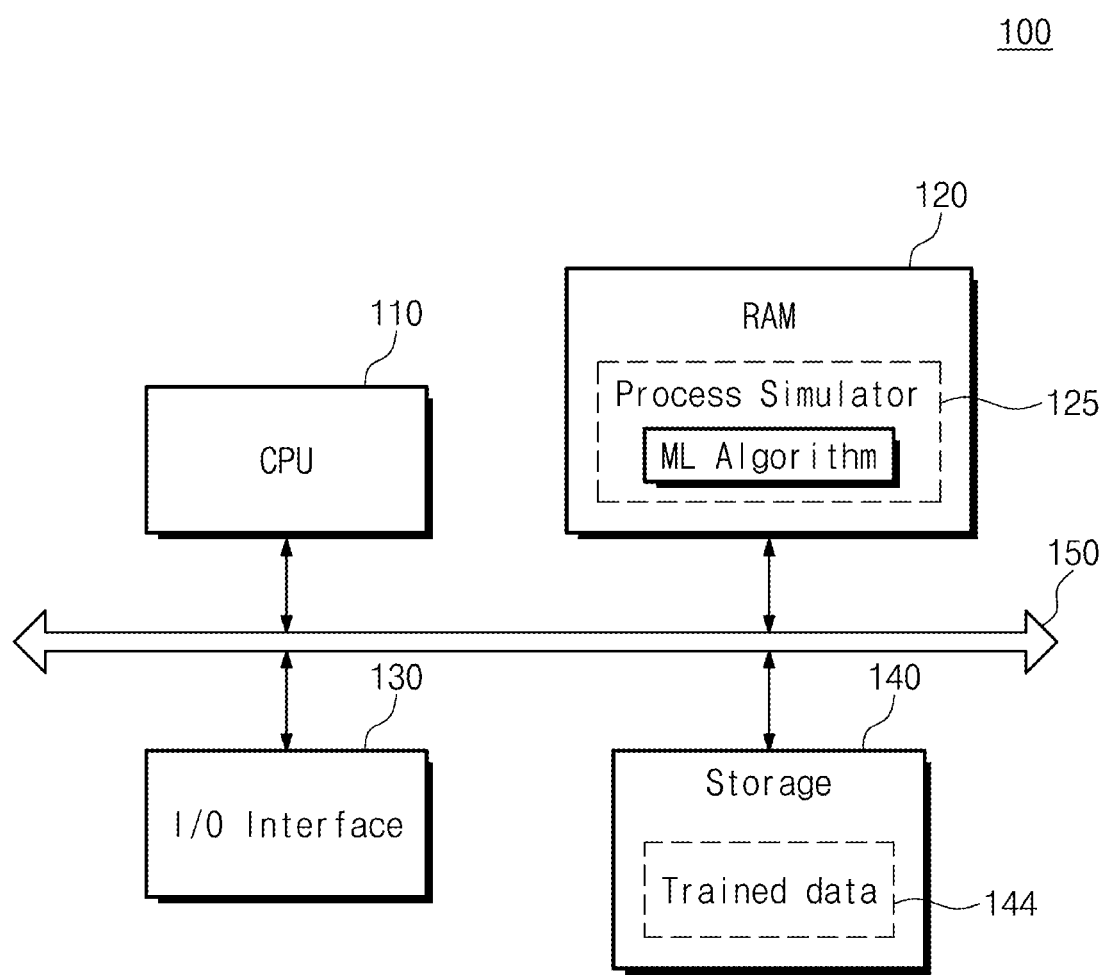
FIG. 1 is a block diagram illustrating a process simulation system according to an example embodiment.

It should be understood that both the foregoing general description and the following detailed description are provided as examples, and it should be regarded as an additional description is provided. Reference numerals will be represented in detail in example embodiments, examples of which are illustrated in the accompanying drawings. Wherever possible, the same reference numerals are used in the drawings and the description to refer to the same or similar parts.

Below, example embodiments of the disclosure may be described in detail and clearly to such an extent that an ordinary skilled in the art can easily implement the disclosure.

FIG. 1 is a block diagram illustrating a process simulation system according to an example embodiment.

Referring to FIG. 1, a process simulation system 100 according to an example embodiment may include a central processing unit (CPU) 110, a random access memory (RAM) 120, an input/output interface 130, storage 140, and a system bus 150. Here, the process simulation system 100 may be implemented with a dedicated device for performing the process simulation by using machine learning according to an example embodiment, but may be implemented with a computer or a workstation driving a design program such as a TCAD (Technology Computer-Aided Design) or ECAD (Electronic Computer-Aided Design) simulation program.

The CPU 110 runs software (e.g., an application program, an operating system, and device drivers) to be executed in the process simulation system 100. The CPU 110 may execute the operating system OS (not illustrated) loaded to the RAM 120. The CPU 110 may execute various application programs to be driven based on the operating system OS. For example, the CPU 110 may execute a process simulator 125 loaded to the RAM 120. The process simulator 125 of an example embodiment may include a machine learning (ML) algorithm that uses given training data.

The operating system OS or the application programs may be loaded to the RAM 120. When the process simulation system 100 is booted up, an OS image (not illustrated) stored in the storage 140 may be loaded to the RAM 120 depending on a booting sequence. Overall input/output operations of the process simulation system 100 may be supported by the operating system OS. Additionally, the application programs that are selected by a user or are used to provide a basic service may be loaded to the RAM 120. In particular, the process simulator 125 of an example embodiment may also be loaded from the storage 140 to the RAM 120. The RAM 120 may be a volatile memory, such as a static random access memory (SRAM) or a dynamic random access memory (DRAM), or a nonvolatile memory, such as a phase-change RAM (PRAM), a magnetic RAM (MRAM), a resistive RAM (ReRAM), a ferroelectric RAM (FRAM), or a NOR flash memory.

The process simulator 125 performs a process simulation operation by using the machine learning algorithm according to an example embodiment. In particular, the process simulator 125 may be trained in a manner in which a feature of a time series profile for each process operation is reflected. For example, in the case of applying a general machine learning technique to simulate an etching process, an irreversible time series profile may be generated. There may be a case in which, in applying the general machine learning technique, a profile of an intermediate process step is difficult to generate physically or experientially. However, the process simulator 125 of an example embodiment may use functions or data capable of solving the above issue in various schemes. This will be described in detail later with reference to drawings.

The input/output interface 130 controls user inputs and outputs from and to user interface devices. For example, the input/output interface 130 may include a keyboard or a monitor and may be provided with a command or data from the user. Also, target data to be used for training the process simulator 125 of an example embodiment may be provided through the input/output interface 130. The input/output interface 130 may display a progress and a processed result of each simulation operation of the process simulation system 100.

The storage 140 is provided as a storage medium of the process simulation system 100. The storage 140 may store the application programs, the OS image, and various kinds of data. In addition, the storage 140 may store and update trained data 144 as the process simulator 125 is driven. The storage 140 may be implemented with a memory card (e.g., a multimedia card (MMC), an embedded MMC (eMMC), a secure digital (SD), and a microSD) or a hard disk drive (HDD). The storage 140 may include a high-capacity NAND-type flash memory. Alternatively, the storage 140 may include a next-generation nonvolatile memory, such as a PRAM, an MRAM, a ReRAM, or a FRAM, or a NOR flash memory.

The system bus 150 is a system bus for providing a network within the process simulation system 100. The CPU 110, the RAM 120, the input/output interface 130, and the storage 140 may be electrically connected through the system bus 150 and may exchange data with each other through the system bus 150. However, the configuration of the system bus 150 is not limited to the above description and may further include arbitration devices for efficient management.

According to the above description, the process simulation system 100 may perform simulation on a semiconductor manufacturing process by using the process simulator 125.

When a final profile is provided, profiles corresponding to intermediate process steps may also be provided by the process simulation system 100. A time series causal relationship may be reflected to the profiles corresponding to the intermediate process steps by the process simulator 125 of an example embodiment.

Figure 2A:
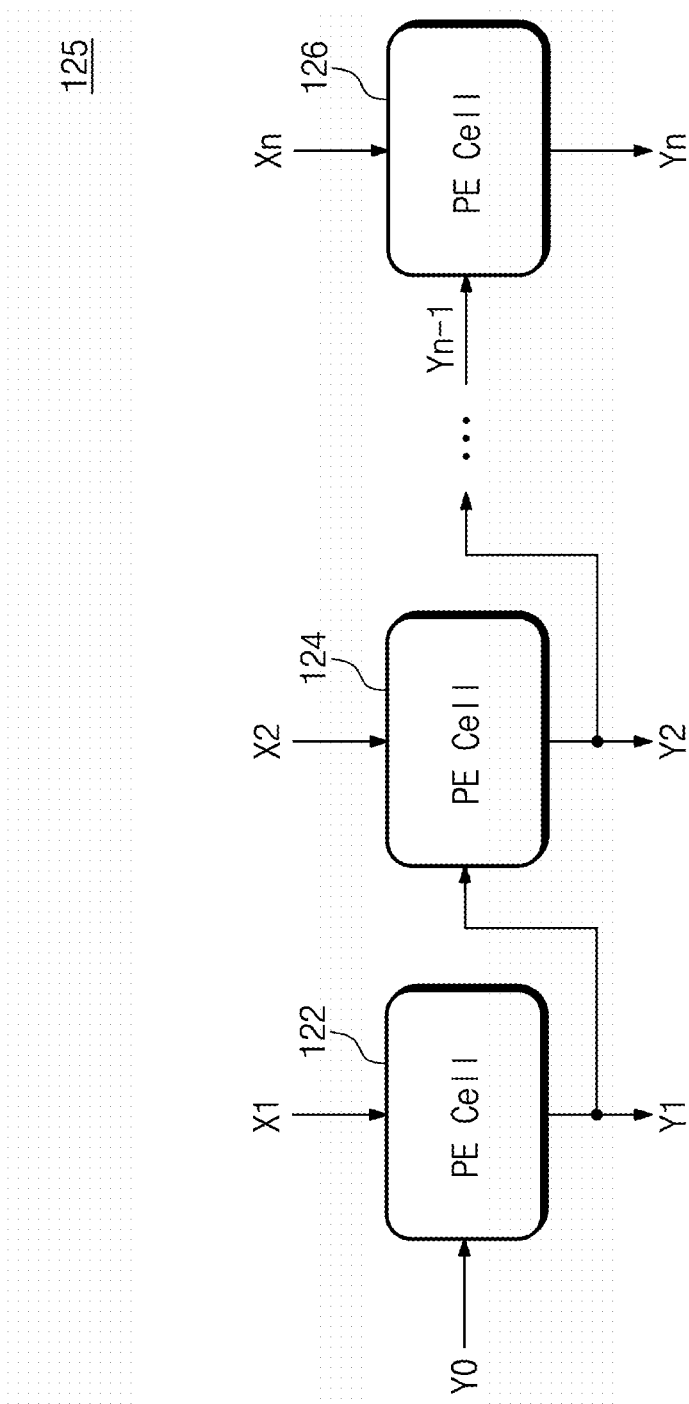
FIGS. 2A to 2C are diagrams for explaining a process simulator of an example embodiment.
Figure 2B:
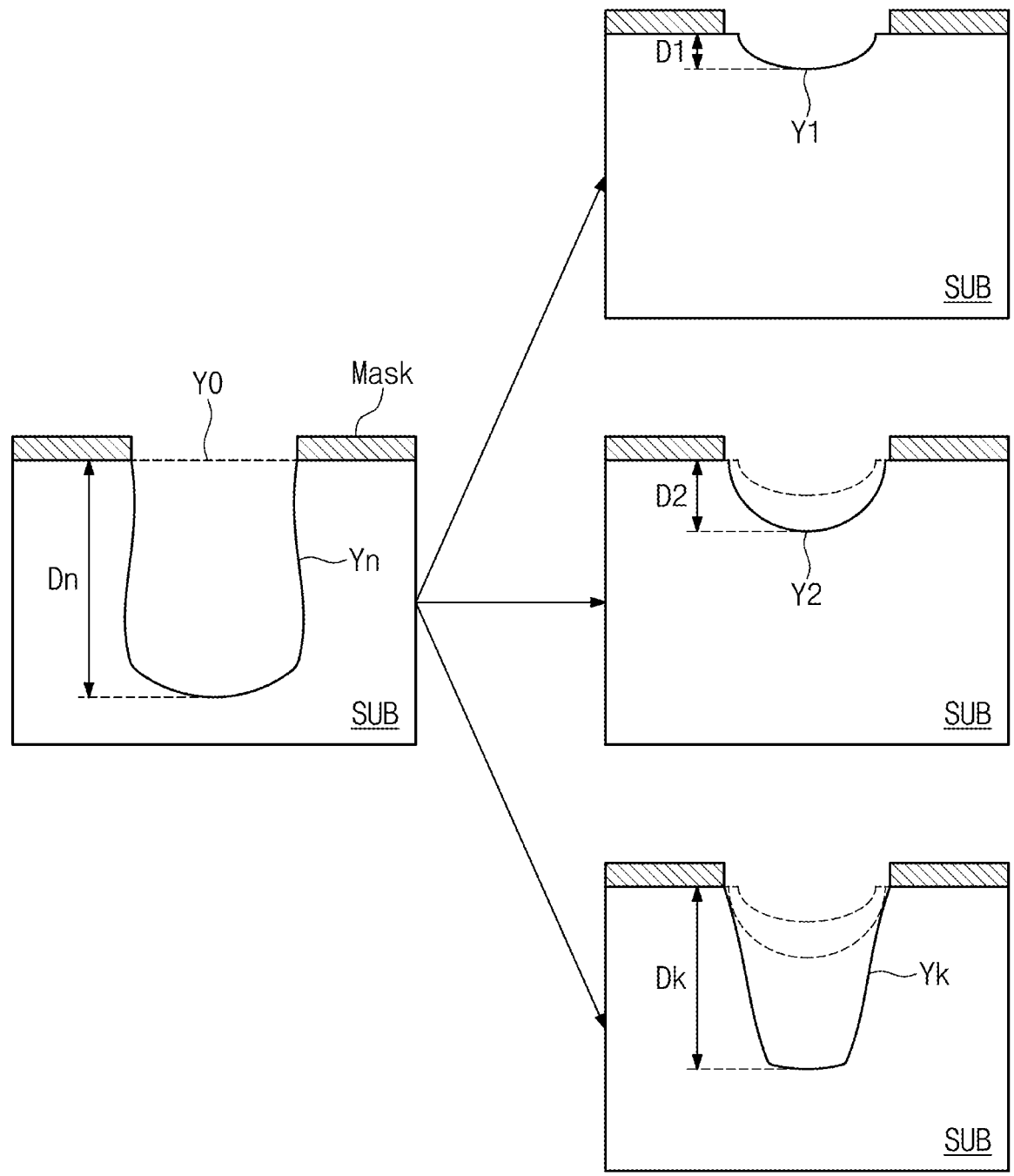
Figure 2C:
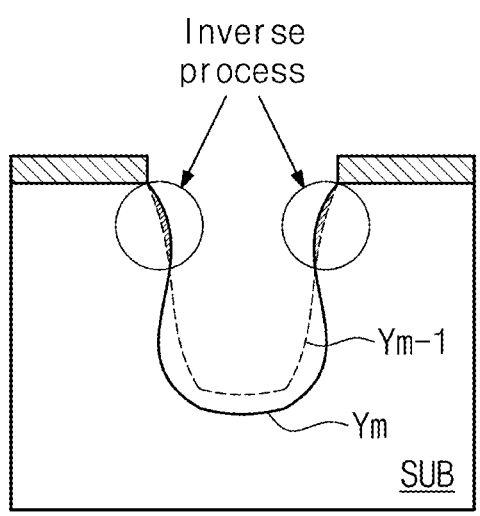

FIGS. 2A to 2C are diagrams for explaining a process simulator of an example embodiment. FIG. 2A illustrates an example structure of the process simulator 125 of an example embodiment, which is implemented with a recurrent neural network RNN. FIG. 2B illustrates an operation of estimating profiles Y1, Y2, . . . Yk at intermediate process steps based on a final profile Yn. FIG. 2C is a diagram illustrating removal of an error of machine learning by the process simulator 125 of an example embodiment.

Referring to FIG. 2A, the process simulator 125 of an example embodiment may include the recurrent neural network RNN in which process emulation cells 122, 124, and 126 corresponding to respective process steps are arranged in time series. The recurrent neural network RNN is advantageous to process data sequentially in time. That is, an output of one layer may be used as an input of another layer. The process simulator 125 may represent a process such as, for example but not limited to, etching, deposition, diffusion, and implantation, as a process including a plurality of process steps progressing in time series. Each process step means a process unit in which there is a change to at least one of conditions, which are applied to a process, such as a temperature, a gas kind, a pressure, and an exposure time, or there is a change to equipment that is used. For the convenience of explanation, the process simulator 125 that applies to a process of etching is described below as an example.

First, the process emulation cell 122 corresponding to a first process step outputs an output Y1 (or a current output profile) corresponding to a profile that is obtained at a current process step by using an execution result $Y_0$ (or a previous output profile) of a previous process step and an input $X_1$ of the current process step. For example, the process emulation cell 122 is a layer of the recurrent neural network RNN, which emulates the first step of the etching process. Accordingly, the execution result $Y_0$ of the previous process step, which is provided to the first step of the etching process, is an initial value (e.g., a profile of a state in which etching is not made). In addition, the input $X_1$ of the current process step may include parameters associated with conditions to be applied to the first process step, which is the first step of the etching process. Each of the process emulation cells 122, 124, and 126 includes a profile network PN configured to perform training of the recurrent neural network RNN that receives an output of a previous process step and predicts a next process step. In addition, each of the process emulation cells 122, 124, and 126 of an example embodiment includes a prior knowledge network PKN for minimizing an error due to the freedom of neural network training within each process emulation cell.

The process emulation cell 124 uses the execution result Y1 of the first step process step and an input $X_2$ of a second process step for the purpose of simulating the second process step. The input $X_2$ of the second process step may include parameters associated with conditions to be applied to the second process step, which is the second step of the etching process. The structure of the process emulation cell 124 is substantially identical to the process emulation cell 122. That is, the process emulation cell 124 also includes the profile network PN for performing training of the recurrent neural network RNN and the prior knowledge network PKN for removing an error of a profile. An input $X_1$ of each process step associated with each process condition is variable, but the process emulation cells 122, 124, and 126 may each include the profile network PN and the prior knowledge network PKN have the same structure.

The process emulation cell 126 performs a recurrent neural network operation corresponding to the last process step. The process emulation cell 126 may perform prediction and training on a profile of the last process step by using an output Yn−1 of a previous process step and an input Xn of an n-th process step (i.e., the last process step).

In the case where the training is sufficiently performed on the last output Yn corresponding to the target profile (or the final target profile), profiles corresponding to the outputs Y1 to Yn−1 of the respective process steps may be profiles of high accuracy. That is, the profiles corresponding to the outputs Y1 to Yn−1 of the respective process steps may be accurately estimated to be substantially the same as profiles that are actually generated in the respective process steps.

FIG. 2B is a diagram illustrating a characteristic of the process simulator 125 of an example embodiment illustrated in FIG. 2A. Referring to FIG. 2B, the outputs Y1, Y2, and Yk of intermediate process steps according to the shape of the last output Yn corresponding to the final profile of an example embodiment are illustrated as an example.

In the last output Yn, a hole having a depth Dn may be formed in a substrate SUB as illustrated in FIG. 2B. The last output $Y_n$ may be, for example, in a shape of a target profile that is output from the process simulator 125. In the case where a profile of the same shape as the last output $Y_n$ is provided, the process simulator 125 according to an example embodiment may calculate outputs of intermediate process steps in a shape of a profile that does not contradict a physical shape formed in an actual etching process or an experiential shape.

For example, in the output Y1 of the first process step, a depth D1 of an etched hole produced through simulation may always have a smaller value than a depth D2 of a hole corresponding to the output Y2 of the second process step. However, when the machine learning using a general recurrent neural network RNN is applied, this rule may be violated. In contrast, according to the process simulator 125 of an example embodiment, a profile of a shape that cannot be generated experientially or due to a physical law in time series may be prevented. That is, a depth DK of an etched hole corresponding to the output Yk of a k-th process step has a value that is at least equal to or greater than a depth of an etched hole of a previous process step. According to an example embodiment, it may be possible to obtain a more accuracy profile of an intermediate process step through the process simulator 125 that uses information about the time series causal relationship.

The aspects and advantages of an example embodiment are described above with reference to an etching process, but the disclosure is not limited thereto. For example, in the implantation process or the deposition process, the process simulator 125 may be implemented and trained in the same manner as described above, except that parameters and a shape of a final profile change according to the type of the process.

FIG. 2C is a diagram schematically illustrating an advantage provided by a process simulator of an example embodiment. Referring to FIG. 2C, a case that contradicts a time series causal relationship may be detected by the process simulator 125 according to an example embodiment. For example, a profile Ym−1 of a (m−1)-th process step preceding in time series and a profile Ym of an m-th process step are schematically illustrated.

When a simulation is performed using the general machine learning, the profile Ym−1 marked by a dotted line may show that etching is further made, compared to the profile Ym marked by a solid line. That is, a profile of a process step that is first performed in time series in an etching process may show that etching is made more excessively than a profile of a process step later performed in the etching process. This error may result from the training that is based on limited information of an intermediate process step of the machine learning. The prior knowledge network PKN that is used in the process simulator 125 of an example embodiment may prevent the generation of a profile that cannot be produced in an actual process or contradicts the physical law. Therefore, the process simulator 125 of an example embodiment may estimate a profile of each process step in a process with high accuracy. Also, based on the estimated profile for each process step according to an example embodiment, a defect inspection operation of detecting a defect in a process step may be performed with high accuracy.

Figure 3A:
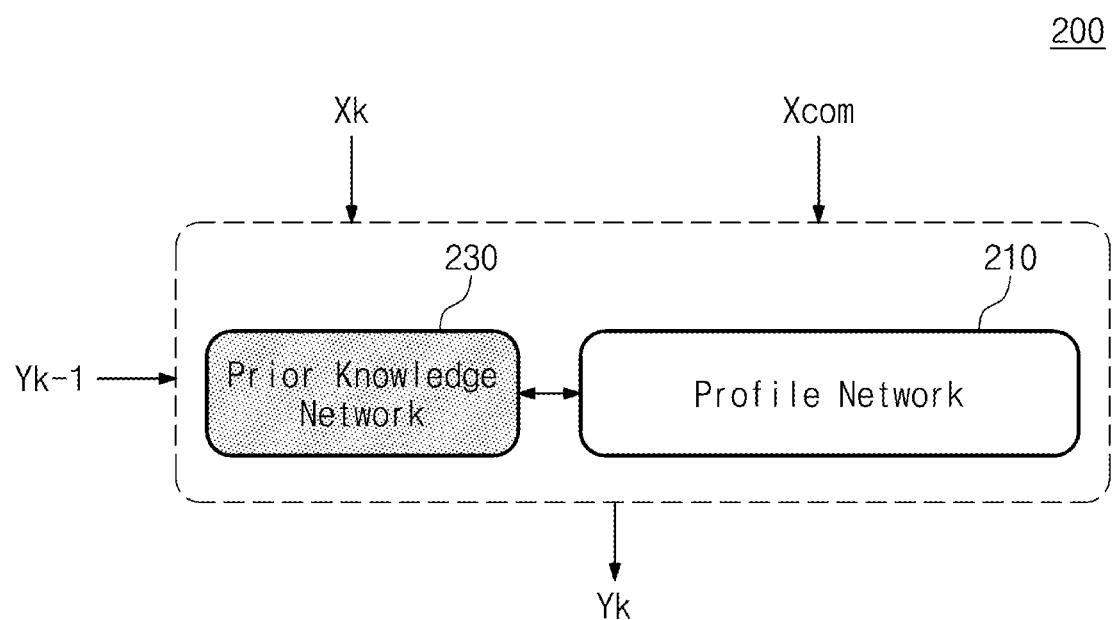
FIGS. 3A and 3B are diagrams illustrating a schematic characteristic of one of process emulation cells illustrated in FIG. 2A.
Figure 3B:
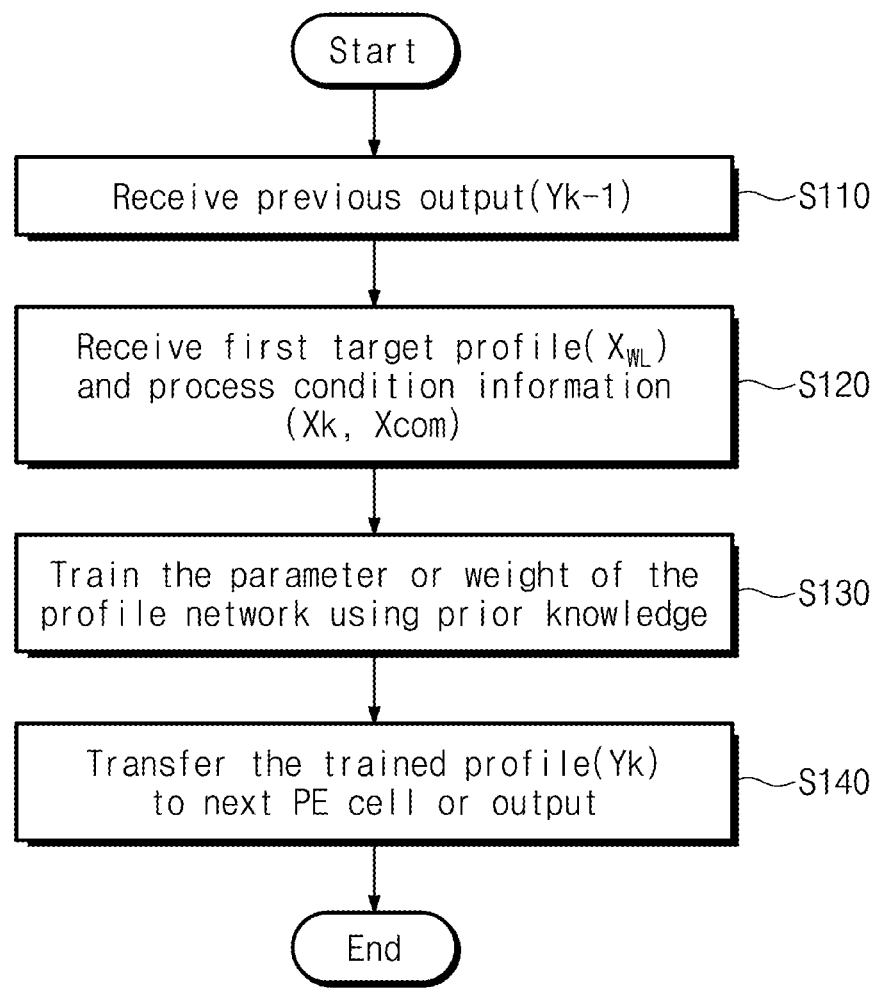

FIGS. 3A and 3B are diagrams illustrating a schematic characteristic of one of process emulation cells illustrated in FIG. 2A. Referring to FIG. 3A, a process emulation cell 200 that corresponds to one basic unit for constituting the recurrent neural network RNN includes a profile network 210 and a prior knowledge network 230.

The profile network 210 performs training for generating an output Yk of a current process step "k" (k being a natural number and 1≥k≥n) by using inputs Xk and Xcom provided at the current process step and an output Yk−1 of a previous process step "k−1". For example, the profile network 210 performs training by using a target profile of a current process step "k" and the output Yk−1 of the previous process step "k−1". The first input Xk includes coordinates or various process conditions corresponding to the target profile of the current process step "k". The second input Xcom may include a value defining recipes to be applied in common to all process steps including the current process step "k".

The prior knowledge network 230 may control a training operation of the profile network 210. For example, the prior knowledge network 230 provides a filtering value or a limit value of the output Yk of the current process step "k" trained by the profile network 210. In the case where simulation is performed on an etching process, the prior knowledge network 230 may filter a profile of a shape that cannot be generated at the output Yk of the current process step "k" with reference to the etching amount of each step of the etching process. Alternatively, the prior knowledge network 230 may restrict a profile of a shape that cannot be generated at the output Yk of the current process step "k" by using a cumulative etching amount of process steps progressing in time series. To perform this filtering, the prior knowledge network 230 may utilize at least one of various prior knowledges based upon which the output Yk of the current process step is forced. A shape of an output may be forced by newly defining a loss function by using a prior knowledge, by restricting a boundary of an output value, or by using an experiential profile. The prior knowledge may also include a result value of another simulation software (e.g., TCAD).

Referring to FIG. 3B, a training and profile generation operation that is performed by using prior knowledge information at the process emulation cell 200 of FIG. 3A is illustrated.

In operation S110, the process emulation cell 200 receives the output Yk−1 of the previous process step "k−1". When the current process step is the first process step, the previous process step may not exist, and thus, the initial value Y0 may be provided as the output of the previous process step "k−1".

In operation S120, the process emulation cell 200 receives the inputs Xk and Xcom provided at the current process step "k" (k being a natural number and 1≥k≥n). The inputs Xk and Xcom include information defining a shape of a target profile $X_{WL}$ of a current process step and process condition information. Here, operation S110 and operation S120 may be simultaneously performed, or one of operation S110 and operation S120 may be first performed.

In operation S130, the process emulation cell 200 may perform training by using the profile network 210 and the prior knowledge network 230 and may generate the output Yk of the current process step "k". In particular, the prior knowledge network 230 may restrict or guide the training operation of the profile network 210. The generation of a profile that is impossible in a process progressing in time series may be prevented by the prior knowledge network 230.

In operation S140, the process emulation cell 200 may transfer the output Yk of the current process step "k" to a next process emulation cell linked in time series. However, in the case where the output Yk of the current process step "k" is the last process step of the process simulator 125, the process emulation cell 200 may output the output Yk of the current process step as a final result value Yn.

An operation that is performed at the process emulation cell 200 of an example embodiment is briefly described above. However, it may be well understood that the function or configuration of the prior knowledge network 230 for restricting the training operation or the prediction operation of the process emulation cell 200 may be variously changed without limitation to the above description.

FIG. 4 is a table schematically illustrating information or parameters provided to train a process emulation cell according to an example embodiment. Input data of the table illustrated in FIG. 4 may be provided to the process emulation cell 200. Inputs that are provided to the process emulation cell 200 may be classified into four groups: ①, ②, ③, and ④.

Coordinates corresponding to a target profile $X_{WL}$ may be included in the input of the first group ①. The target profile $X_{WL}$ that is intended to be formed through a process step exists for each process step. In the case of an etching process, shapes of target profiles of respective process steps are differently defined. For example, a depth "D" and a width "W" of an etched hole may be defined to increase in every process step. The target profile $X_{WL}$ may be expressed by the coordinates and data of the coordinates are processed by the process emulation cell 200.

The output Yk−1 of the previous process step ("Incoming Structure") and mold information Xcom are included in the second group ② of input data. The output Yk−1 of the previous process step may include a value that is essential to the RNN operation that performs time series processing. The output Yk−1 of the previous process step is a value corresponding to a shape of a profile trained at the previous process step. The mold information Xcom is information about a material of a substrate or a mask under an etching, deposition, or implantation process. Information about a thickness of a substrate or a mask or information about a kind of a material of the substrate or mask may be included in the mold information Xcom.

Information about equipment or a chamber for a process being currently applied or information about preventive maintenance ("PM information") may be included in the third group ③ of input data. The information included in the third group ③ may vary depending on the equipment and the chamber and may be commonly provided to all of process steps together with the mold information.

Information about a reticle to be used in a process being currently applied, information about at least one process performed before the process being currently applied ("Structure Scheme"), constant parameters to be applied to the current process ("Constant Recipe"), and a sequence recipe Xk of the current process step may be included in the fourth group ④ of input data. Except for the sequence recipe Xk, the inputs Xcom that are applied in common to all of process steps are included in the input data of the fourth group ④. In contrast, the sequence recipe Xk may include the information about conditions applied in a current step of a process to be simulated. Examples of the sequence recipe Xk may include a kind of a gas, a concentration, a temperature, a pressure, and an application time.

Examples of inputs to be provided to the process emulation cell 200 are described as schematically being classified into four groups ①, ②, ③, and ④, but it should be understood that an example embodiment is not limited to the above example. Additional information may be further included, or one or more of the above inputs may be selectively omitted depending on an embodiment.

Figure 5:
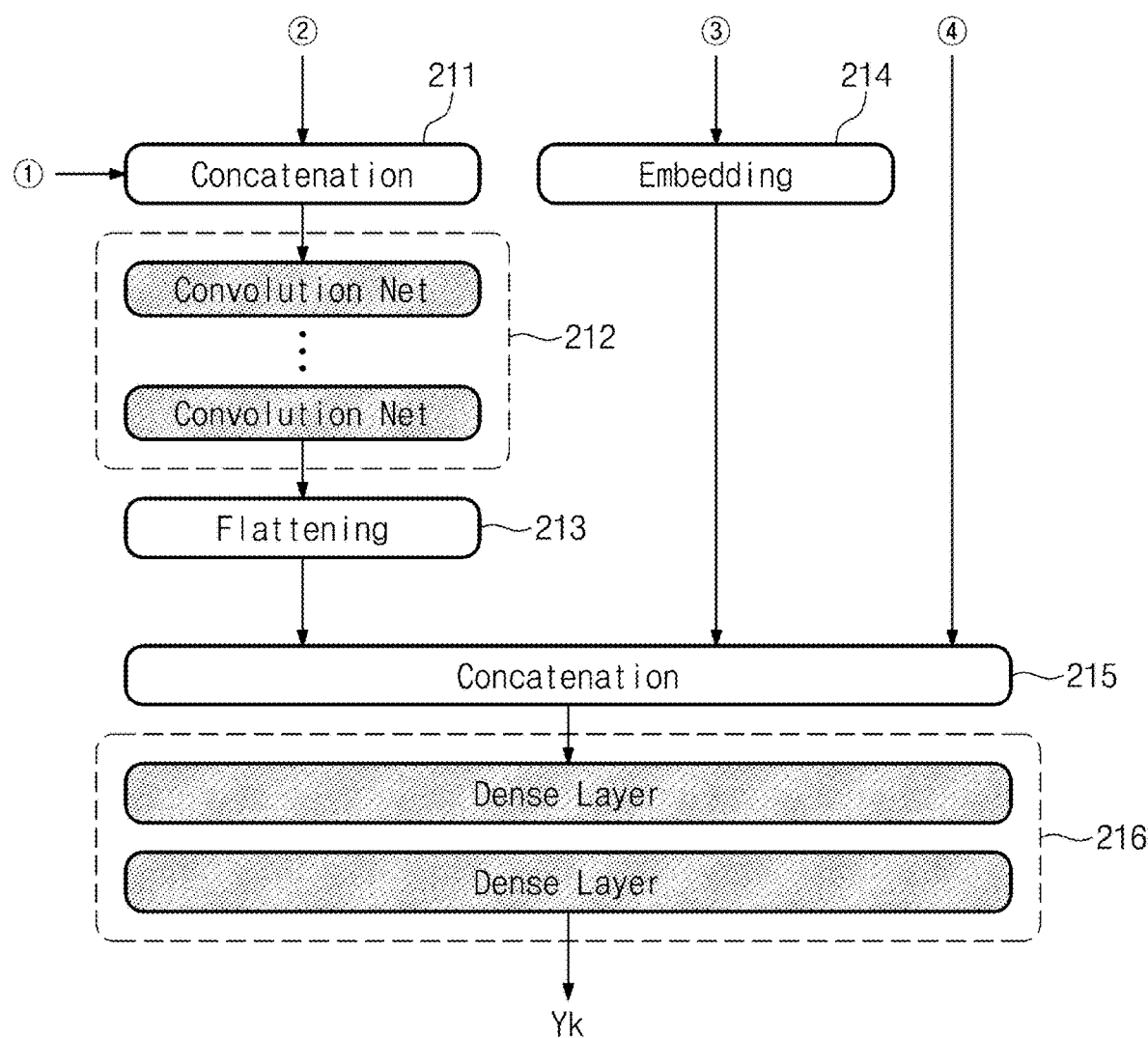
FIG. 5 is a diagram for explaining an example computation structure of a profile network illustrated in FIG. 3.

FIG. 5 is a diagram for explaining an example computation structure of a profile network illustrated in FIG. 3. Referring to FIG. 5, the profile network 210 includes function blocks constituting the general recurrent neural network RNN.

First, the first and second group inputs ① and ② are concatenated by a first concatenation element 211. That is, an input value of the second group ② including the output Yk−1 of the previous process step and the mold information Xcom and the coordinates corresponding to a target profile $X_{WL}$ are concatenated by the first concatenation element 211.

A concatenated value of the first concatenation element 211 is processed by a first training neural network 212. The first training neural network 212 may include a convolutional neural network CNN using the first and second group inputs ① and ②. Data that are output from the convolutional neural network CNN may be data that are multi-dimensionally arranged. A flattening element 213 performs a task to one-dimensionally rearrange the multi-dimensionally arranged output of the first training neural network 212.

An embedding element 214 converts the third group input ③ to a value capable of being processed by the profile network 210. Information about equipment or a chamber or setting information about the equipment or chamber may be information of a category form. Accordingly, the embedding element 214 performs embedding processing to convert this category information into numerical information. At least one of schemes, which are utilized in the recurrent neural network RNN, such as skip-gram, negative sampling, and GloVe may be applied to the embedding processing.

Data flattened by the flattening element 213, an output of the embedding element 214, and the fourth group input ④ may be concatenated by a second concatenation element 215. The data concatenated by the second concatenation element 215 are trained by a deep neural network 216. The output Yk of the current process step may be provided as the trained result.

Figure 6:
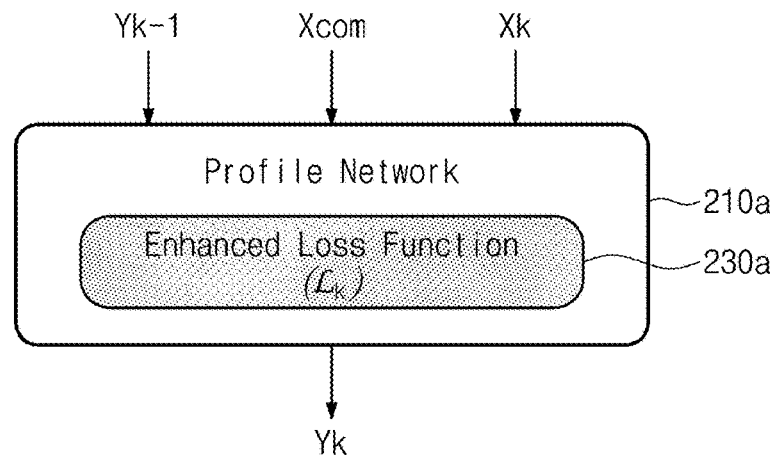
FIG. 6 is a diagram illustrating a configuration of a process emulation cell according to an example embodiment.

FIG. 6 is a diagram illustrating a configuration of a process emulation cell according to an example embodiment. Referring to FIG. 6, a process emulation cell 200a according to an example embodiment may prevent an abnormal profile from being generated, through an enhanced loss function 230a included in a profile network 210a.

The enhanced loss function ($L_k$) 230a is applied to the profile network 210a every process step. The profile network 210a of an example embodiment may receive the output Yk−1 of the previous process step, the common input Xcom, and the sequence recipe $X_k$ of the current process step. The training or prediction operation may be performed by using the input values in the scheme described with reference to FIG. 5. In particular, the enhanced loss function ($L_k$) 230a is used in the profile network 210a. The training may be performed to suppress the generation of a profile of a shape that is impossible to appear in an actually physical environment through the enhanced loss function ($L_k$) 230a.

In general, a loss function is used as an index indicating a training state of the recurrent neural network RNN. The profile network 210a may repeat the training procedure of adjusting a weight parameter for reducing the size of the enhanced loss function ($L_k$) 230a. In particular, the enhanced loss function ($L_k$) 230a may be configured such that a greater loss function is generated in the case of a profile of a shape that cannot be allowed at a previous process step and a current process step. For example, the enhanced loss function ($L_k$) 230a may be defined by Equation 1 below.

$$L_k = L + \lambda \sum_{k=1}^{n} Relu(Y_{k-1} - Y_k) \quad \text{[Equation 1]}$$

Here, "L" may use a mean squared error (MSE) or a cross entropy error (CEE) defined in a conventional loss function. In particular, in an example embodiment, a "Relu" function for a difference value "Yk−1−Yk" between an output value of a previous process step and an output value of a current process step is added to the loss function. The "Relu" function is a function in which an output value of "0" is output with regard to an input value smaller than "0" and an output value linearly increases with regard to increase of an input value of "0" or more. Accordingly, when the difference value "Yk−1−Yk" obtained by subtracting an output value Yk of a current process step from an output value Yk−1 of a previous process step is greater than "0" and increases, a value of a loss function increases. Accordingly, the training may be made to reduce a value of the enhanced loss function. In addition, a value of the "Relu" function accumulated from the first process step to the current process step "k" is applied to a loss function $L_k$ of the current process step "k". As a weight "λ" is applied, the strength of the tendency of training may be controlled. In the case of applying the loss function $L_k$ described with reference to Equation 1, the training may be made to suppress the case where a profile of a previous process step has a greater value than a profile of a current process step. Accordingly, the loss function $L_k$ of Equation 1 may be applied to processes, in which a process result at a current process step always increases compared to a previous process step, such as etching, deposition, and implantation. In contrast, the loss function $L_k$ expressed by Equation 2 below may be used in a process, in which a total process amount is always preserved, such as diffusion. The enhanced loss function ($L_k$) 230a may be defined by Equation 2 below.

$$L_k = L + \lambda \sum_{k=1}^{n} \left( \int Y_{k-1} - \int Y_k \right)^2 \quad \text{[Equation 2]}$$

Here, "L" and "λ" may denote the same parameters as Equation 1. A dopant of the same amount has to be implanted at all steps of the diffusion process. Accordingly, the loss function $L_k$ for the diffusion process may be implemented to suppress the case where a total amount of a dopant of a previous process step and a total amount of a dopant of a current process step is variable. Accordingly, a value that corresponds to a square of a value obtained by subtracting the dopant amount of the current process step from the dopant amount of the previous process step may be reflected to a loss function.

The loss function $L_k$ expressed by Equation 1 or Equation 2 is only given as an example and the enhanced loss function ($L_k$) 230a according to an example embodiment is not disclosed thereto.

The process simulator 125 (refer to FIG. 1) may be trained by the process emulation cell 200a for each process step using the above enhanced loss function ($L_k$) 230a so as to generate a profile shape that may be formed in an actual process.

Figure 7:
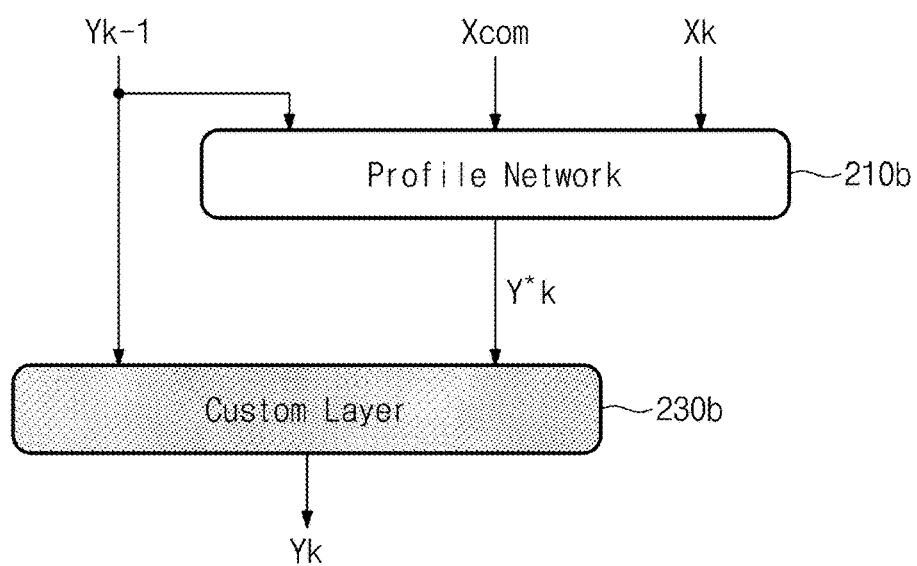
FIG. 7 is a diagram illustrating a configuration of a process emulation cell according to an example embodiment.

FIG. 7 is a diagram illustrating a configuration of a process emulation cell according to an example embodiment. Referring to FIG. 7, a process emulation cell 200b according to an example embodiment may include a profile network 210b that provides a process result Y*k generated at a current process step and a custom layer 230b that defines a causal relationship between a previous process step and a current process step.

The profile network 210b may receive the output Yk−1 of the previous process step, the common input Xcom, and the sequence recipe Xk of the current process step. The training or estimation operation may be performed by using the input values in the scheme described with reference to FIG. 5. In particular, the profile network 210b may be configured to infer and train the process result Y*k of the current process step by using the above input parameters, instead of generating the accumulated process result Yk. That is, the profile network 210b may output and train the process result Y*k corresponding to a process amount of only the current process step, not a profile corresponding to a total accumulated process amount accumulated by the first process step to the current process step.

The custom layer 230b receive the output Yk−1 of the previous process step and the process result Y*k of the current process step. The custom layer 230b is an added layer to calculate a causal relationship in which a process result Y*k of a current process step is accumulated on the output Yk−1 corresponding to a process result of a previous process step. For example, in the case of the etching process, the custom layer 230b deduces a physical law that an etching amount of a current process step is added to the output Yk−1 corresponding to a process result of a previous process step, resulting in the accumulated processing result Yk in the current process step. The physical law applied in each process step may be applied by the custom layers 230b included in the process emulation cells in each of process steps.

An operation in which the custom layer 230b receives and processes the output Yk−1 of the previous process step and the process result Y*k of the current process step may be expressed by Equation 3 below.

$$Y_k = Y_{k-1} + Y^*_k \qquad \text{[Equation 3]}$$

According to Equation 3 above, it would be understood that the output Yk of the current process step generated at the profile network 210b is obtained by adding the process result Y*k generated at the current process step to the output Yk−1 of the previous process step. That is, the above custom layer 230b may be applied to a process such as etching, deposition, or implantation. However, this physical law may not be applied to a diffusion process in which a total process amount is preserved. Accordingly, it may be difficult to apply the modeling for diffusion to the process simulation using the custom layer 230b.

Figure 8A:
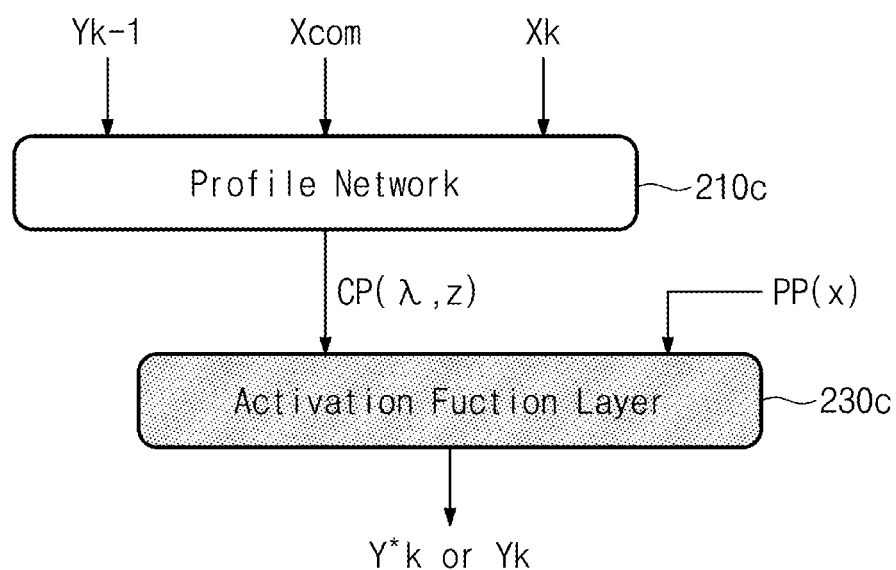
FIGS. 8A to 8C are diagrams illustrating a configuration and a characteristic of a process emulation cell according to an example embodiment.
Figure 8B:
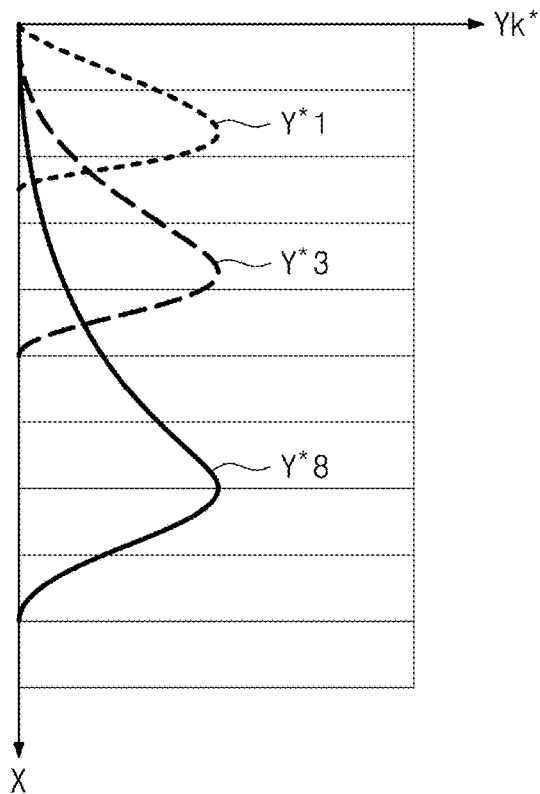
Figure 8C:
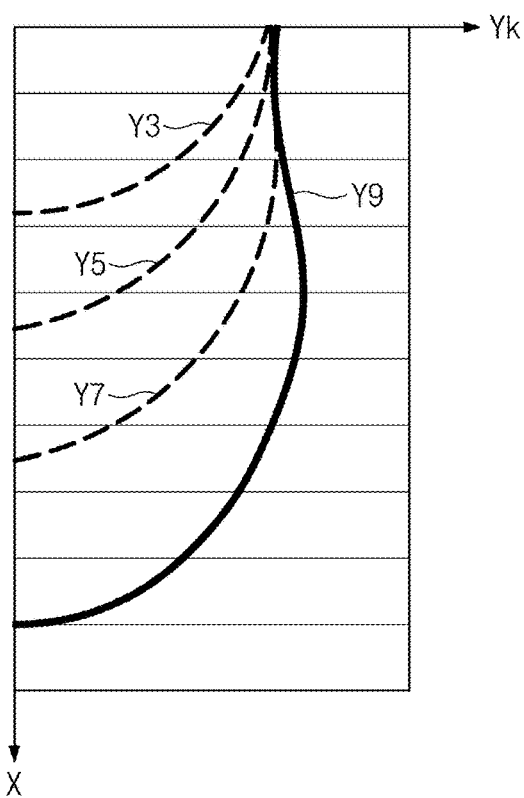

FIGS. 8A to 8C are diagrams illustrating a configuration and a feature of a process emulation cell according to an example embodiment. Referring to FIG. 8A, a process emulation cell 200c according to an example embodiment may include a profile network 210c that trains and generates critical parameters (CP) (λ, z) and an activation function layer 230c that applies an activation function. Here, the activation function layer 230c performs a function of the prior knowledge network 230 (refer to FIG. 3).

The profile network 210c may receive the output Yk−1 of the previous process step, the common input Xcom, and the sequence recipe Xk of the current process step. The training or estimation operation may be performed by using the input values in the scheme described with reference to FIG. 5. In particular, the profile network 210c trains and generates the critical parameters (λ, z) by using the output Yk−1 of the previous process step, the common input Xcom, and the sequence recipe Xk of the current process step. The critical parameters (λ, z) include variables that determine a form of an activation function.

The activation function layer 230c is provided with the trained or estimated critical parameters (λ, z) from the profile network 210c. In addition, the activation function layer 230c is provided with a physical parameter (PP) "x" of the current process step. The physical parameter "x" may mean, for example, a variable indicating a size of a depth or a width in an etching process. An activation function that forces a shape of a profile of each process step to be similar to an actual physical shape is used in the activation function layer 230c. In the case of the etching process, an activation function may have a shape of a function indicating an etching amount of a current process step or an etching amount accumulated from the first process step to the current process step. The activation function that is in the shape of an exponential function modeling the etching amount of the current process step may be modeled as Equation 4 below.

$$Y^*_k = f(x) = \frac{z}{\lambda}\left(\frac{x}{\lambda}\right)^{z-1} e^{-\left(\frac{x}{\lambda}\right)^z} \qquad \text{[Equation 4]}$$

Here, "x" indicates a physical parameter (e.g., an etch depth), "k" and "z" indicate critical parameters. An activation function f(x) expressed by Equation 4 models an etch amount in each process step in the form of an exponential function.

However, the activation function may be a function indicating an etch amount accumulated from the first process step to the current process step. In this case, an output of the activation function layer 230c may be the output Yk indicating a profile accumulated until the current process step. In the above condition, the profile network 210c may be trained to generate the critical parameters (λ, z) for generating the accumulated output Yk or the output Y*k of the current process step in the same shape as the activation function.

FIG. 8B is a graph illustrating an activation function expressed by Equation 4. Referring to FIG. 8B, an activation function indicating an etch amount of each of three process steps 1, 3, and 8 is illustrated.

For example, it may be understood that an activation function Y*1 of the first process step (k=1) has a relatively great etch amount at a shallow depth "x". In addition, an activation function of the eighth process step (k=8) is an exponentially increasing function indicating a maximum etch amount at a relatively deep depth "x". The profile network 210c may train the critical parameters (λ, z) such that the output Y*k of the current process step is generated in accordance with the shapes of the above activation functions.

FIG. 8C is a graph illustrating a shape of an activation function on coordinates, which has a shape indicating an etch amount accumulated from a first process step to a current process step. Referring to FIG. 8C, an activation function indicating an accumulated etch amount of each of four process steps 3, 5, 7, and 9 is illustrated.

It may be understood from an activation function Y5 of the fifth process step (k=5) that an etch amount in a direction of a depth "x" of a substrate is further increased compared to an activation function Y3 of the third process step (k=3). An activation function may be decided by an etch amount accumulated along the depth "x" of the substrate at respective process steps. In this case, the profile network 210c may train the critical parameters (λ, z) such that the output Y*k of the current process step is generated in the shape of an activation function corresponding to the accumulated etch amount.

Figure 9:
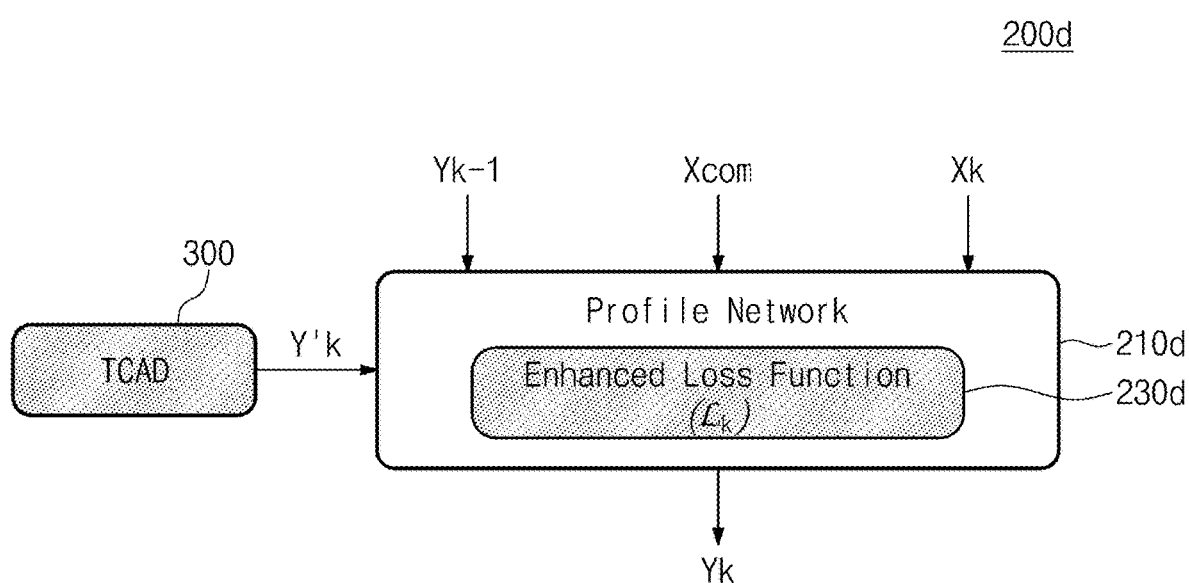
FIG. 9 is a diagram illustrating a configuration of a process emulation cell according to an example embodiment.

FIG. 9 is a diagram illustrating a configuration of a process emulation cell according to an example embodiment. Referring to FIG. 9, a process emulation cell 200d according to an example embodiment may include a profile network 210d that performs training and estimation by using prior information Y'k obtained through another simulation program (e.g., TCAD 300). Here, the TCAD 300 is mentioned as an example of another simulation program, but the disclosure is not limited thereto. The prior information Y'k corresponding to a schematic profile for training and estimating the output Yk of the current process step may be obtained in various modeling manners or simulation software.

An enhanced loss function ($L_k$) 230d is applied to the profile network 210d of each step of a process. The profile network 210d of an example embodiment may receive the output Yk−1 of the previous process step, the common input Xcom, and the sequence recipe Xk of the current process step. The profile network 210d may perform a training or prediction operation by using the input values in the scheme described with reference to FIG. 5.

In the example embodiment illustrated in FIG. 9, the enhanced loss function ($L_k$) 230d using the prior information Y'k provided from the TCAD 300 is used in the profile network 210d. The profile network 210d may perform training through the enhanced loss function ($L_k$) 230d such that the output Yk is converged to be similar in shape to the prior information Y'k. The profile network 210d may repeat the training procedure of manipulating a weight or a parameter for reducing the size of the enhanced loss function ($L_k$) 230d. For example, the enhanced loss function ($L_k$) 230d may be expressed by Equation 5 below.

$$L_k = L + \lambda \sum_{k=1}^{n} (Y'_k - Y_k)^2 \quad \text{[Equation 5]}$$

Here, "L" may use a mean squared error (MSE) or a cross entropy error (CEE) defined in a conventional loss function. "k" is a weight, and the prior information Y'k is prior information provided from the TCAD 300. The profile network 210d may perform training such that the size of the enhanced loss function ($L_k$) 230d is reduced. Accordingly, the output Yk may be trained by the profile network 210d using the enhanced loss function $L_k$ of Equation 5, so as to be similar or identical to the prior information Y'k in shape.

In the case where the prior information Y'k provided by the simulation software such as the TCAD 300 has high accuracy, the effect of training may be improved through Equation 5 above. However, in some cases, the prior information Y'k may provide a schematic shape of each process step or a progress tendency of a process, rather than providing an accurate shape of a profile. In this case, the enhanced loss function $L_k$ expressed by Equation 6 below may be used.

$$L_k = L + \lambda \sum_{k=1}^{n} \sum_{l=1}^{m} \left( \frac{\partial Y'_k}{\partial Z^l} - \frac{\partial Y_k}{\partial Z^l} \right)^2 \quad \text{[Equation 6]}$$

By the process emulation cell 200d of each process step using the enhanced loss function ($L_k$) 230d, the process simulator 125 (refer to FIG. 1) may be trained to output a profile shape implemented by another simulation software. In this case, the training speed of the process simulator 125 may be substantially improved.

Figure 10:
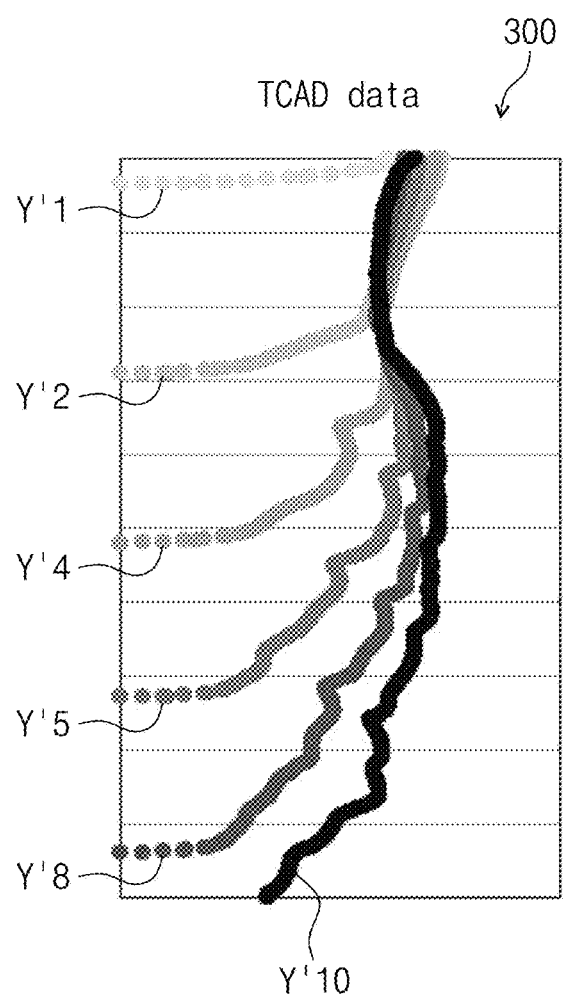
FIG. 10 is a diagram schematically illustrating an example of prior information provided from another simulation software according to an example embodiment.

FIG. 10 is a diagram schematically illustrating prior information provided from another simulation software. FIG. 10 shows a graph schematically illustrating the prior information Y'k corresponding to profiles of respective process steps and provided from the TCAD 300. It may be understood from FIG. 10 that a schematic shape is similar to a shape of an actual profile even if the schematic shape is somewhat different from an actually physical profile shape. In addition, even if the prior information Y'k does not provide an accurate shape of a profile, the prior information Y'k may provide the development of changes for each process step. In this case, a curve that the prior information Y'k indicates may be somewhat shaped by differentiating the curve.

Figure 11:
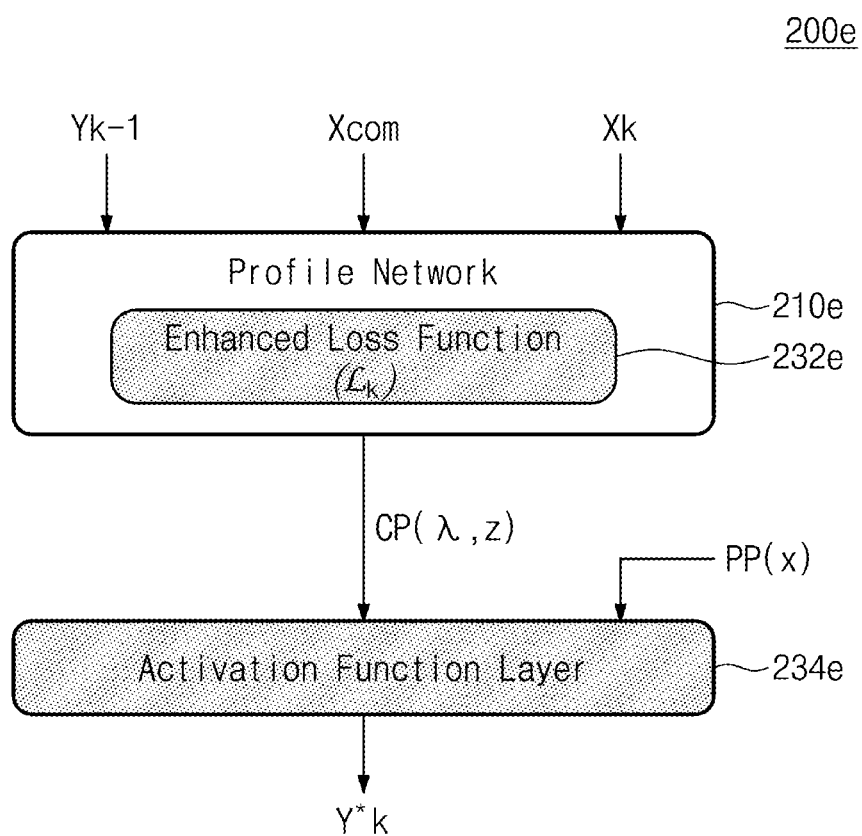
FIG. 11 is a diagram illustrating a configuration and a characteristic of a process emulation cell according to another example embodiment.

FIG. 11 is a diagram illustrating a configuration and a characteristic of a process emulation cell according to another example embodiment. Referring to FIG. 11, a process emulation cell 200e provides a structure based on a combination of the example embodiment of FIG. 6 and the example embodiment of FIG. 8A.

An enhanced loss function ($L_k$) 230e is applied to a profile network 210e. The profile network 210e of an example embodiment may receive the output Yk−1 of the previous process step, the common input Xcom, and the sequence recipe Xk of the current process step. The training or prediction operation may be performed by using the input values. In particular, the enhanced loss function ($L_k$) 230e is used in the profile network 210e. Training may be performed based on the enhanced loss function ($L_k$) 230e such that generation of a profile of which of a shape cannot appear in a real application is suppressed. The profile network 210e of an example embodiment generates and trains the critical parameters (λ, z) that are provided to an activation function layer 234e.

The activation function layer 234e is provided with the trained or estimated critical parameters (λ, z) from the profile network 210e. In addition, the activation function layer 234e is provided with the physical parameter "x" of the current process step. The physical parameter "x" may mean, for example, a variable indicating a size of a depth or a width in an etching process. An activation function that forces a shape of a profile of each process step to be similar to an actual physical shape is used in the activation function layer 234e. However, the activation function may be in the shape of a function indicating an etch amount accumulated from the first process step to the current process step. In this case, an output of the activation function layer 234e may be the output Yk indicating a profile accumulated until the current process step. In the above condition, the profile network 210e may be trained to generate the critical parameters ($\lambda$, z) for generating the accumulated output Yk or the output Y*k of the current process step in the same form as the activation function.

Figure 12:
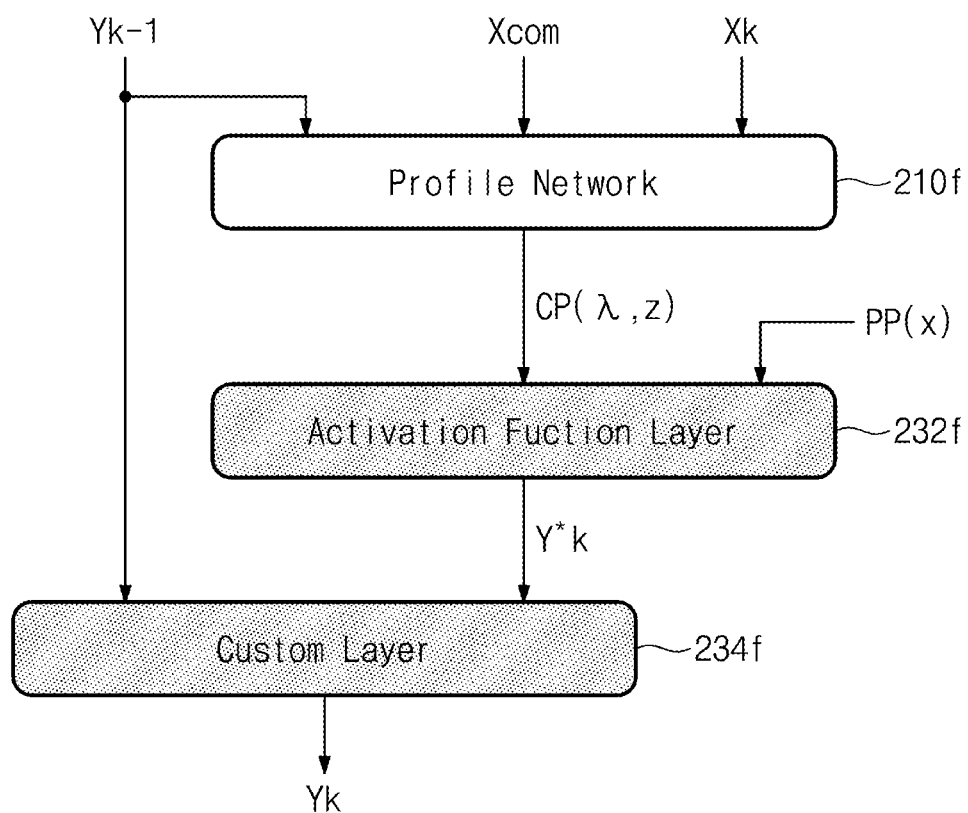
FIG. 12 is a diagram illustrating a configuration and a characteristic of a process emulation cell according to another example embodiment.

FIG. 12 is a diagram illustrating a configuration and a characteristic of a process emulation cell according to another example embodiment. Referring to FIG. 12, a process emulation cell 200f provides a structure based on a combination of the example embodiment of FIG. 7 and the example embodiment of FIG. 8A. The process emulation cell 200f may include a profile network 210f, an activation function layer 232f, and a custom layer 234f.

The profile network 210f may receive the output Yk−1 of the previous process step, the common input Xcom, and the sequence recipe Xk of the current process step. The training or prediction operation may be performed by using the input values in the scheme described with reference to FIG. 5. In particular, the profile network 210f trains and generates the critical parameters ($\lambda$, z) by using the output Yk−1 of the previous process step, the common input Xcom, and the sequence recipe Xk of the current process step.

The activation function layer 232f is provided with the trained or estimated critical parameters ($\lambda$, z) from the profile network 210f. In addition, the activation function layer 232f is provided with the physical parameter "x" of the current process step. The physical parameter "x" may mean, for example, a variable indicating a size of a depth or a width in an etching process. An activation function that forces a shape of a profile of each process step to be similar to an actual physical shape is used in the activation function layer 232f. However, the activation function may be in the shape of a function indicating an etch amount accumulated from the first process step to the current process step.

The custom layer 234f receives the output Yk−1 of the previous process step and the process result Y*k of the current process step. The custom layer 234f is an added layer to directly calculate a causal relationship in which a process result of a current process step is accumulated on the output Yk−1 corresponding to a process result of a previous process step. For example, in the case of the etching process, the custom layer 234f derives a physical law that an etching amount of a current process step is added to the output Yk−1 corresponding to a process result of a previous process step. This common-sense physical law may be applied by the custom layers 234f added to process emulation cells of all process steps.

Figure 13:
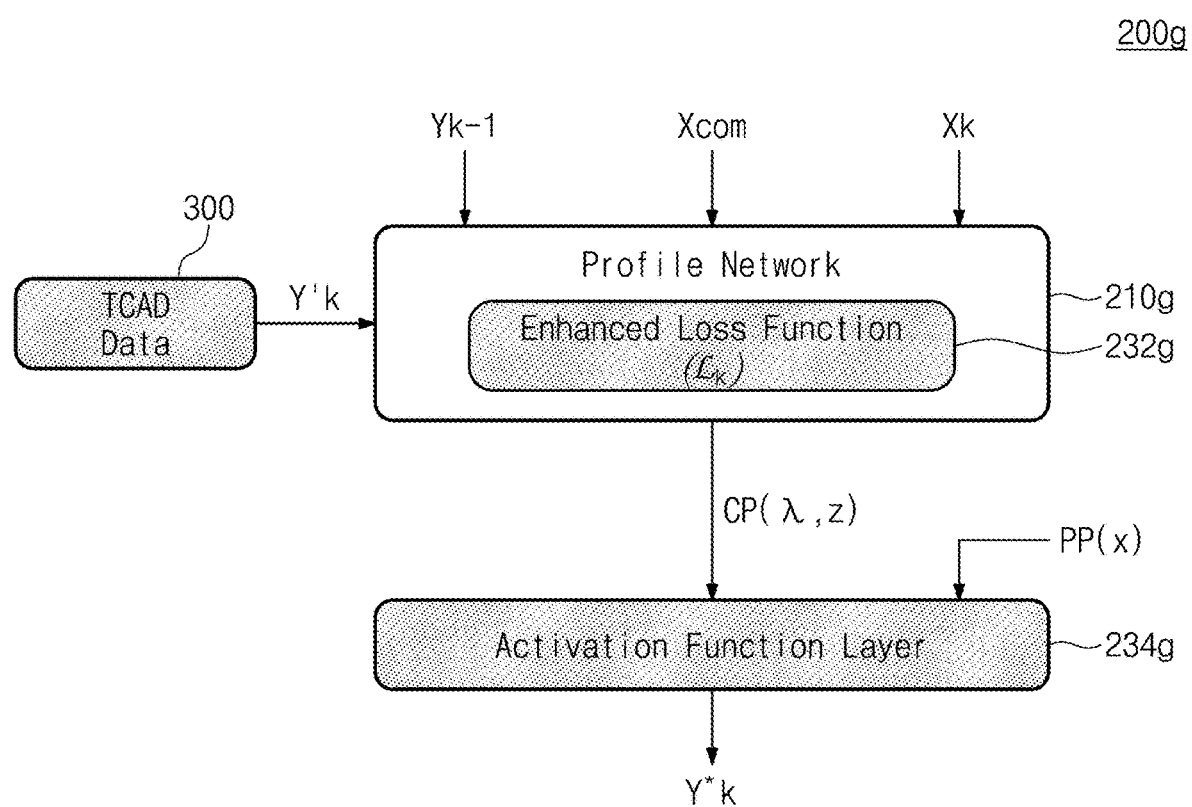
FIG. 13 illustrates a configuration of a process emulation cell according to an example embodiment.

FIG. 13 illustrates a configuration of a process emulation cell according to an example embodiment. Referring to FIG. 13, a process emulation cell 200g provides a structure based on a combination of the example embodiment of FIG. 6, the example embodiment of FIG. 8A, and the example embodiment of FIG. 9.

An enhanced loss function ($L_k$) 232g is applied to a profile network 210g. The profile network 210g of an example embodiment may receive the output Yk−1 of the previous process step, the common input Xcom, and the sequence recipe Xk of the current process step. The training or estimation operation may be performed by using the input values. In particular, the enhanced loss function ($L_k$) 232g is used in the profile network 210g. The training may be performed to suppress the generation of a profile of a shape that cannot appear in a real application by using the enhanced loss function ($L_k$) 232g. In particular, the profile network 210g may be provided with the prior information Y'k from simulation software such as the TCAD 300. The profile network 210g generates and trains the critical parameters ($\lambda$, z) to be provided to an activation function layer 234g by using the prior information Y'k.

The activation function layer 234g is provided with the trained or estimated critical parameters ($\lambda$, z) from the profile network 210g. In addition, the activation function layer 234g is provided with the physical parameter "x" of the current process step. The physical parameter "x" may mean, for example, a variable indicating a size of a depth or a width in an etching process. An activation function that forces a shape of a profile of each process step to be similar to an actual physical shape is used in the activation function layer 234g. However, the activation function may be in the shape of a function indicating an etch amount accumulated from the first process step to the current process step. In this case, an output of the activation function layer 234g may be the output Yk indicating a profile accumulated until the current process step. In the above condition, the profile network 210g may be trained to generate the critical parameters ($\lambda$, z) for generating the accumulated output Yk or the output Y*k of the current process step in the same form as the activation function.

Figure 14:
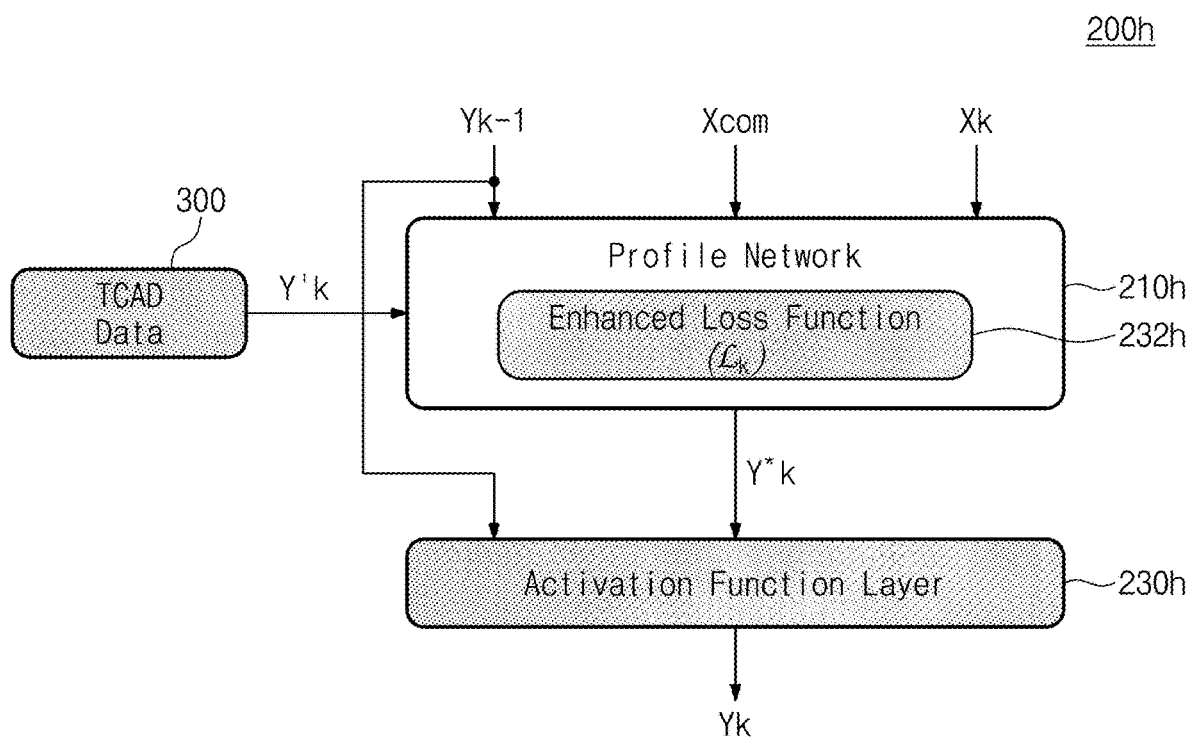
FIG. 14 is a diagram illustrating a configuration and a characteristic of a process emulation cell according to another example embodiment.

FIG. 14 is a diagram illustrating a configuration and a feature of a process emulation cell according to another example embodiment. Referring to FIG. 14, a process emulation cell 200h provides a structure based on a combination of the example embodiment of FIG. 7, the example embodiment of FIG. 8A, and the example embodiment of FIG. 9. The process emulation cell 200h may include the TCAD 300 providing the prior information Y'k, a profile network 210h, and a custom layer 230h.

The profile network 210h may receive the output Yk−1 of the previous process step, the common input Xcom, and the sequence recipe Xk of the current process step. The training or estimation operation may be performed by using the input values. In particular, the profile network 210h may generate the output Y*k of the current process step indicating a process amount of only the current process step by using the output Yk−1 of the previous process step, the common input Xcom, and the sequence recipe Xk of the current process step. In particular, the profile network 210h may be provided with the prior information Y'k from simulation software such as the TCAD 300. The profile network 210h generates and trains the output Y*k of the current process step to be provided to the custom layer 230h by using the prior information Y'k.

The custom layer 230h receives the output Yk−1 of the previous process step and the process result Y*k of the current process step. The custom layer 230h is an added layer to directly calculate a causal relationship in which a process result of a current process step is accumulated on the output Yk−1 corresponding to a process result of a previous process step. For example, in the case of the etching process, the custom layer 230h derives a physical law that an etching amount of a current process step is added to the output Yk−1 corresponding to a process result of a previous process step.

This common-sense physical law may be applied by the custom layers 230h added to process emulation cells of all process steps.

In a process simulation device and a method thereof, according to example embodiments, a profile of each step of a process may be estimated with high accuracy. In addition, according to the process simulation device of an example embodiment, a profile may be estimated for each process step with high accuracy only by using data of a final profile. Accordingly, a time and costs required for designing a semiconductor process to perform process tuning may be substantially reduced. Additionally, based on the estimated profile for each process step, a defect inspection operation of detecting a defect in a process step may be performed with high accuracy.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A simulation method performed by a process simulator, the process simulator being implemented with a recurrent neural network (RNN) driven on a computer system and including a plurality of process emulation cells, the plurality of process emulation cells being arranged in time series and configured to train and predict, based on a final target profile in a process of manufacturing a semiconductor, a profile of each process step included in the process of manufacturing the semiconductor, the simulation method comprising:
   receiving, at a first process emulation cell, a previous output profile provided at a previous process step;
   receiving, at the first process emulation cell, a target profile of a current process step and process condition information indicating one or more conditions to be applied in the current process step; and
   generating, at the first process emulation cell, a current output profile corresponding to the current process step, based on the target profile, the process condition information, and prior knowledge information, the prior knowledge information defining a time series causal relationship between the previous process step and the current process step.

2. The simulation method of claim 1, wherein the prior knowledge information is provided to a loss function of a profile network included in the first process emulation cell, the profile network configured to perform training of the recurrent neural network.

3. The simulation method of claim 2, wherein the loss function includes a "Relu" function of a value obtained by subtracting an output value corresponding to the current output profile from an output value corresponding to the previous output profile.

4. The simulation method of claim 3, wherein the plurality of process emulation cells are configured to model at least one of an etching process, a deposition process, and an implantation process.

5. The simulation method of claim 2, wherein the loss function includes a value obtained by subtracting an integral value corresponding to the current output profile from an integral value corresponding to the previous output profile.

6. The simulation method of claim 1, wherein the generating comprises generating the current output profile further based on a custom layer included in the first process emulation cell, the custom layer configured to prevent a causal relationship violating a physical law from being included in the prior knowledge information.

7. The simulation method of claim 1, wherein the prior knowledge information corresponds to an activation function forcing a shape of the current output profile to be similar to an actual physical shape of a profile to be generated in the current process step.

8. The simulation method of claim 7, wherein the activation function defines an amount of processing performed in the current process step.

9. The simulation method of claim 7, wherein the activation function defines an amount of processing accumulated from a first process step to the current process step.

10. The simulation method of claim 1, wherein the prior knowledge information includes an execution result of a first simulation software, and the first process emulation cell is trained by a profile network by using an enhanced loss function including the execution result of the first simulation software.

11. A process emulation cell included in a recurrent neural network (RNN), driven on a computer system and including a plurality of process emulation cells, the plurality of process emulation cells being arranged in time series and configured to train and predict, based on a final target profile in a process of manufacturing a semiconductor, a profile of each process step included in the process of manufacturing the semiconductor, the process emulation cell comprising:
   a profile network configured to receive a previous output profile that is output at a previous process step in time series, a target profile of a current process step, and process condition information indicating one or more conditions to be applied in the current process step, and configured to generate a current output profile corresponding to the current process step by performing a training operation, based on the target profile, the process condition information, and prior knowledge information; and
   a prior knowledge network configured to restrict the training of the profile network based on the prior knowledge information provided from an outside,
   wherein the prior knowledge information is provided to a function or a layer defining a time series causal relationship between the previous process step and the current process step in the process of manufacturing the semiconductor.

12. The process emulation cell of claim 11, wherein the prior knowledge network is further configured to provide an enhanced loss function that restricts the training operation of the profile network.

13. The process emulation cell of claim 12, wherein the enhanced loss function includes a "Relu" function of a value obtained by subtracting an output value corresponding to the current output profile from an output value corresponding to the previous output profile.

14. The process emulation cell of claim 12, wherein the enhanced loss function includes a value obtained by subtracting an integral value corresponding to the current output profile from an integral value corresponding to the previous output profile.

15. The process emulation cell of claim 12, wherein the prior knowledge network includes a custom layer configured to prevent a causal relationship violating a physical law being included in the prior knowledge information.

16. The process emulation cell of claim 12, wherein the prior knowledge network includes an activation function layer configured to guide a critical parameter provided from the profile network to be trained to a shape of a given activation function.

17. The process emulation cell of claim 12, wherein the prior knowledge network is configured to provide the enhanced loss function that is based on an output value of a simulation software.

* * * * *